Patented Mar. 11, 1952

2,588,442

UNITED STATES PATENT OFFICE 2,588,442

ORGANIC POLYSULFIDE TYPE ADHESIVE

Frederick J. Wehmer, Birmingham, and James M. McClellan, Jr., Detroit, Mich., assignors to Minnesota Mining & Manufacturing Company, St. Paul, Minn., a corporation of Delaware No Drawing. Application July 26, 1947, Serial No. 764,020

5 Claims. (Cl. 260—3.3)

The present invention relates to adhesive compositions and the art of producing the same. More particularly, it relates to adhesives having properties never heretofore attained in ordinary rubber adhesives. This application is a continuation-in-part of our copending application Serial No. 416,390, filed October 24, 1941.

Ordinary rubber cements or adhesives are not resistant to gasoline; either they swell, or dissolve directly, when exposed to gasoline and other hydrocarbon solvents. Also, ordinary thin rubber films are not sufficiently impervious to gasoline and like solvents to make them satisfactory in building up or constructing so-called bullet-proof gasoline tanks.

One of the salient objects of the present invention is to produce an adhesive composition which, in the form of the dried film or coating, does not swell or dissolve in gasoline or the like and which is highly impervious to the passage of gasoline or like solvents. A further object is to produce a composition of good adhesive qualities which can be used as a coating for cloth to produce a highly impervious composite sheet material and which, furthermore, does not deteriorate the cloth, as will certain synthetic rubbers containing halogens which tend to produce acid conditions in the cloth during usage and deteriorate the same; this is important in the making of balloon cloth or dirigibles, for example. A further object is to provide an adhesive or coating composition which can, for example, successfully be used as a coating for balsa wood life rafts and will provide a continuous coating, free from pin holes and highly resistant to deterioration upon exposure to sunlight and the elements generally, and which further will be resistant to water and any other fluids or oils with which such life rafts might accidentally come in contact.

From the point of view of the composition itself a salient object of the present invention is to produce a composition from olefine polysulfide type resins, or other organic polysulfides, which is an adhesive. Where the term "adhesive" is employed in the present application it is to be understood that it is employed in its common, practical sense as used in the adhesive arts today and refers to a composition having a specific adhesion to smooth metal, glass and like surfaces at least comparable to that provided by a reclaimed rubber-rosin gasoline solvent type cement such as described in Zimmerli et al. Patent No. 1,892,123, as contrasted with films of materials such as films of latex rubber which, relatively speaking, have substantially no specific adhesion to glass and smooth metal surfaces and can be stripped therefrom with very little effort as soon as one corner of such film is loosened.

So far as we know we are the first ones who ever produced an adhesive composition from an olefine polysulfide type resin.

The above and other objects and advantages of the present invention will appear from the application taken as a whole.

A number of specific examples are given hereinafter to illustrate the nature of our invention.

Example I 350 pounds ethylene dichloride (solvent) are placed in a churn-type mixer and there is added thereto 25 pounds of maleic anhydride treated rosin (i. e. maleic anhydride-rosin addition product—Diels-Alder synthesis) and 50 pounds of chlorinated rubber and the stirring is continued until the batch is smooth. Then there is added thereto, in comminuted form or small pieces, a previously prepared milled base, produced by milling on a rubber mill the following ingredients:

| | Parts by weight |
|---|---|
| Organic polysulfide resin | 100 |
| Benzothiazyl disulfide | 0.3 |
| D. P. G. (diphenylguanidine) | 0.1 |
| Carbon black | 30.0 |
| Zinc oxide | 10.0 |
| Sulfur | 1.5 |

It will be noted that the above ingredients constitute 141.9 parts in all and from this 100 pounds (as distinguished from parts) are added to the churn-type mixer, as aforesaid, after first being cut up or broken up into small squares or pieces. The churning is continued until the solution is completed, and the composition is then ready to be put into containers for shipment.

No heating or cooling is necessary during the making procedure aforesaid, ordinary room temperatures being satisfactory (although higher or lower temperatures may be used). However, of course, the batch will warm up somewhat above room temperature due to the energy spent in the mechanical mixing.

A specific organic polysulfide or olefine polysulfide type resin which has been found particularly satisfactory is "Thiokol F A."

The carbon black employed was one of the more finely divided carbon blacks of the so-called semi-reinforcing type as used in the rubber industry.

The sulfur employed should be finely divided, preferably powdered, such as so-called flowers of sulfur.

The above composition is unique in that it has good adhesion to dried films of the same adhesive itself and also has good adhesion to smooth metal surfaces and various other smooth surfaces; also it has good adhesion to vulcanized and unvulcanized "Thiokol" compounds such as may be used in the construction of barrage balloons and "bullet-proof" gasoline tanks.

The specific composition above illustrated may be effectively used in the making of bullet-proof gasoline tanks in constructions such as the following: the inner metal surface of the gasoline tank is coated with one or more layers of rubber or other material or composition which will readily swell when gasoline comes in contact therewith. Then there is applied over such coating or coatings a sheet of "Thiokol," usually vulcanized. Heretofore "Thiokol" sheets have been unusable for this purpose because of the lack of any adhesive which is necessary to join the "Thiokol" sheet together at the seams which occur. Of course if the seams are not properly joined together to provide an impermeable surface, as is provided by the rest of the "Thiokol" sheet, gasoline will penetrate through the seams and ruin the whole construction. It is imperative that gasoline be kept out of contact with the underlying layers, which will swell in the presence of gasoline, unless and until the gasoline tank is ruptured by a bullet; because if the gasoline prematurely comes in contact with such swellable material, the material has already done its swelling and will then be useless in closing openings caused by a bullet rupture. This will make it clear why it is imperative to have an impervious surface throughout the entire area of the gasoline tank. The adhesive above described functions very satisfactorily for this purpose and makes sheets of "Thiokol" or the like usable for the first time in this connection.

The above adhesive also has utility in the making of barrage balloons and barrage balloon materials. Such materials are commonly constructed by joining together a multiplicity of relatively narrow strips of suitable material, these strips or pieces being commonly of a size of about 48 inches wide and of such length as may be necessary depending upon the size of the balloon. It will thus be evident that, every 48 inches along the length of the balloon or dirigible, there will be a seam that runs completely around the same. Where such treated cloth or strips of material are made from a woven fabric having a "Thiokol" coating or impregnation (applied either as a surface coating with a solvent or by frictioning the same into the cloth), there was heretofore no adhesive to our knowledge which could be used to join these materials together to construct such a balloon. Our adhesive accordingly has very extensive utility for this and related uses. The above adhesive has been tested at Wright Field, Dayton, Ohio, and, in connection with sheets coated with "Thiokol," satisfactorily meets both of the required tests which are: (1) That the adhesive joining together two sample strips of such cloth, 2 inches wide with a ¾ inch overlap, must suspend an 80 pound weight for 24 hours at 115° F. without rupture of the adhesive joint; and (2) A similar test sample must suspend a 40 pound weight for 24 hours at 135° F. without rupture of the adhesive joint.

It is essential that the cloth be reinforced to meet such tests or the cloth itself would rupture. Of course, from the point of view of resisting diffusion or leakage of gas, impregnation or coating of a fabric sheet is also highly desirable. A composite sheet material of a predetermined low gas diffusion rate can be produced with a much lower weight of organic polysulfide or olefine polysulfide type resin than where rubber is used, as was heretofore common. Thus organic polysulfide treated cloth is very desirable from this point of view and is further highly desirable from the point of its much greater resistance to ageing. Of course neither of these virtues would constitute any usable contribution to the art of making balloon cloth without the provision of a suitable adhesive, which is one of the purposes of this invention as herein above stated.

The following two examples show variations of the composition of Example I, such varied compositions being particularly advantageous in the coating or impregnating of cloth used in making balloons or dirigibles where, for example, one or the other of the adhesives shown in Examples I and IV hereof is used to make seams between adjacent strips of treated cloth, the cloth strips overlapping about one-half to three-fourths of an inch.

*Example II*

150 pounds of ethylene dichloride solvent is placed in a churn-type mixer and to this is added 5 pounds of chlorinated rubber and 3 pounds of maleic anhydride-rosin addition product (Diels-Alder type). The mixing is continued until the solution is uniform and then there is added thereto 92 pounds of a milled base. Said milled base may be made up by milling the following ingredients together on a rubber mill:

| | Parts by weight |
|---|---|
| Organic polysulfide type resin ("Thiokol FA") | 100 |
| Benzothiazyl disulfide ("Altax") | 0.4 |
| Diphenylguanidine (D. P. G.) | 0.15 |
| Carbon black, finely divided (Gastex) | 20.0 |
| Zinc oxide | 10.0 |
| Sulfur | 1.5 |
| Milled base, total parts | 132.05 |

92 pounds of the milled base, produced as just described, is then introduced into the aforesaid solution of chlorinated rubber and maleic anhydride-rosin addition product and the stirring is continued until a smooth uniform solution is prepared.

It will be noted that the composition of Example II differs appreciably from the composition of Example I, both in terms of ingredients and characteristics of the finished product. In respect to the ingredients it will be noted that the composition of Example II has a much lower proportion of both halogenated rubber and maleic anhydride-rosin addition product than does the composition of Example I. In respect to characteristics of the two compositions, while both are tacky adhesives, yet the composition of Example I is definitely better in its ability (in the form of the dried film or coating) to stand up as an adhesive bond under dead-load tests; that is, the film from the composition of Example I has more resistance to what is sometimes referred to as "cold flow." However, where the composition of Example II is to be used as a coating for cloth, it will be understood that resistance to cold flow and ability to withstand a dead-load test does not have the same importance as it does in an adhesive bond itself, e. g. an adhesive bond between two composite sheets or between a fibrous sheet and a metal surface, etc.

We have also made compositions varying from each of the above, such as the following:

Example III 184.5 pounds of ethylene dichloride (solvent) is placed in a churn-type mixer along with 1.8 pounds of a wetting agent such as "Aerosol OT," which is the dioctyl ester of sodium sulfosuccinate. To this is added 5 pounds of chlorinated rubber and 3 pounds of maleic anhydride-rosin addition product (Diels-Alder synthesis). When the materials are mixed to provide a uniform mixture or solution, we then add 115 pounds of a base, produced by milling together 100 parts by weight of the milled base described hereinabove under Example II along with 15 parts of the milled base described hereinbelow, and the mixing is continued until a uniform solution is attained. The maleic anhydride rosin "adduct" (addition product) is a compatible resinous softener for the polyalkylene polysulfide polymer, and additionally has the property of imparting good adhesive qualities thereto.

The milled base last mentioned (of which 15 parts are employed) is produced by milling together with the following ingredients on a rubber mill:

| | Parts by weight |
|---|---|
| Neoprene G (a chloroprene polymer) | 100 |
| Light calcined magnesium oxide | 4.0 |
| Carbon black ("Gastex") | 10.0 |
| Zinc oxide | 4.0 |
| Sulfur | 1.0 |

It will be noted that the solids content of the adhesive of this example is approximately 40%, although the percentage solution is of course not critical.

The main difference between the compositions of Example III over that of Example II is that of increased flexibility of the coated or impregnated balloon cloth or the like. This increase in flexibility is attained in Example III without any very substantial reduction in resistance to permeation by gases, and also without any very substantial reduction in the resistance of the dried film of such composition to solvents such as petroleum solvents and the like.

In the production of compositions intended primarily for use in making adhesive bonds we have secured certain advantages by modifying the composition of Example I in the following manner.

Example IV 350 pounds of ethylene dichloride (solvent) are introduced into a churn-type mixer and there is added thereto 50 pounds chlorinated rubber and 25 pounds of maleic anhydride-rosin addition product, and mixing is continued until the mixture is uniform and solution has been effected. There is then introduced, in the form of small pieces or squares, 100 pounds of a base produced by milling together 87.5 parts of the milled base described hereinabove under Example I with 12.5 parts of the following milled base:

| | Parts by weight |
|---|---|
| Chloroprene polymer (Neoprene G N) | 100 |
| Benzothiazyl disulfide | 0.3 |
| Zinc oxide | 4.0 |
| Light calcined magnesium oxide | 4.0 |

The composition of Example IV, thus produced, has certain advantages over the composition of Example I, including the following: (1) Greater resistance to flexing in the form of an adhesive bond or film; (2) Better application characteristics for a number of purposes due to a longer bonding time; and (3) Somewhat greater resistance to "cold flow." These advantages are secured without any very substantial decrease in the ability of the material to provide a film or coating which is substantially impermeable to the flow of gas and which is also highly resistant to attack by the hydrocarbon solvents, benzol type solvents and certain other fluids.

The adhesive composition of this example contains about 40 parts of rosin-maleic anhydride adduct to 100 parts of polyalkylene polysulfide polymer, whereas that of Example III contained only about 4 parts of adduct to 100 of the polyalkylene polysulfide polymer.

It is to be particularly noted in connection with compositions such as shown in Examples II and III, which may be used, as above pointed out, in coating or impregnating cloth or other fibrous or non-fibrous bases or supports, that such compositions are what may be termed solvent-activatible adhesives as distinguished from pressure-sensitive adhesives; that is, when cloth treated with such compositions is allowed to fully dry the resulting coatings are no longer sticky or tacky and adjacent sheets of treated cloth do not stick together. This is a significant consideration in cloth coating or impregnation, where the composite sheets may be stacked, one on top of another, during storage and/or shipment.

Films formed from compositions of Examples I and IV are also of the solvent-activatible type and not of the pressure-sensitive type, though the considerations just discussed do not apply in respect to straight adhesive bonds, as distinguished from impregnations or surface coatings.

Adhesive compositions such as illustrated in Examples I and IV in certain cases may be more conveniently applied and allowed to dry and then the dry films or coatings may be reactivated with ethylene dichloride or equivalent solvent just prior to the time when the desired bond is to be made.

Example V

A solution is formed in a churn-type mixer of 35 pounds of chlorinated rubber, 15 pounds of maleic anhydride-rosin addition product, and 2 pounds of refined coal tar, in 450 pounds of ethylene dichloride. To this solution is added, in the form of small pieces, a base stock produced by milling together on a warm mill the following ingredients:

| | lbs. |
|---|---|
| Polyalkylene polysulfide polymer as in Ex. 1 | 100 |
| Benzothiazyl disulfide ("Altax") | 2.5 |
| Diphenyl guanidine ("D. P. G.") | 1 |

The above composition produces results substantially equal to those of Example I when used as an adhesive, being highly effective in anchoring Thiokol sheet material, fabric, etc. to itself or to smooth metal surfaces or the like.

One way in which the adhesive properties of this and other similar compositions may conveniently be measured is by means of a strip-back test. In this test, one coat of the liquid adhesive composition is applied to a smooth steel test panel, and three separate coats are applied, with intermediate drying at room temperature, to a strip of #10 canvas. After the final coat is dry, but while it is still tacky, the coated canvas is pressed against the coated steel and rolled down with a hand roller. The specimen is then allowed to age for 3 days at 122° F. in the absence of further pressure, so as to remove all residual traces of solvent. The cooled specimen is tested in a Scott Tensile Tester or other suitable testing apparatus, using a jaw speed of 2 inches per minute. The strip-back value is the number of pounds of pull per inch of width necessary to peel the canvas back on itself and away from the steel panel.

Under the above test conditions, the adhesive composition of Example V gave a strip-back value of 9 pounds per inch width. Tested between coated canvas and a coated smooth sheet of Thiokol, the strip-back value for this adhesive was 8 pounds per inch width.

The production of adhesive compositions, having strip-back values of the order of 8–9 pounds per inch width, from polyalkylene polysulfide polymers, is quite surprising, since previous to our invention it had been generally accepted and also frankly admitted by manufacturers thereof, that such polymers could not be made as tacky as natural rubber, either by breakdown on the mill, or by the addition of oils or resins. A formula typical of those suggested in the art prior to our invention was as follows (see Patrick Patent No. 2,206,643):

| | Parts by weight |
|---|---|
| Polyalkylene polysulfide polymer | 500 |
| Zinc oxide | 50 |
| Tetramethyl thiuram disulfide | 2 |
| Ethylene dichloride | 1,500 |

This formula, when tested against smooth steel and against smooth Thiokol sheeting, gave strip-back values of only 2 and 2½ pounds per inch width respectively. Such adherence is too low for the composition to be considered as an adhesive in the commercial sense and in the sense of this specification. The Patrick composition compares with the composition of this invention as ordinary latex compares with a Zimmerli type adhesive cement. In short, they are far apart in the practical adhesive art.

On the other hand, a reclaimed rubber and rosin base adhesive cement of the type disclosed in Zimmerli Patent No. 1,892,123 hereinbefore mentioned, and consisting of 1000 parts of whole tire reclaim, 180 parts of limed rosin, 540 parts of zinc rosinate, 54 parts of alcohol, and 2500 parts of gasoline, gave strip-back values of 8 pounds per inch width on smooth steel and 4½ pounds on smooth Thiokol sheeting. Thus our novel Thiokol-base adhesive compositions provide specific adhesion at least comparable to that of the Zimmerli type adhesive compositions, and offer the same valuable improvements over previously known liquid Thiokol compositions that the Zimmerli compositions offered over the earlier known rubber mixtures.

While we have illustrated our invention hereinabove in connection with certain specific materials, and specific proportions of materials, and specific solids content, it is to be understood that we do not thereby limit our invention.

Whereas the solids content shown in Examples II and III is approximately 40%, which is convenient where cloth is to be coated by the doctor blade method or equivalent, it will be understood that the solids content of such compositions may be varied within wide limits, for example from 25% or less to 95% or more, depending upon the particular method of application employed. Where very high solids content compositions are employed, or where compositions such as shown in Examples II and III, but with solvent completely absent, are used, the same may be applied to cloth by means of friction rolls or other equivalent means.

The compositions of Examples I and IV are hereinbefore illustrated as being made up of approximately ⅓ solids and ⅔ solvents, and that of Example V as about ¼ solids and ¾ solvents. However, there is nothing critical about these proportions. Very high solids content adhesives may be employed where other measures are taken to secure sufficient wetting of the surfaces to which the adhesive is to be bonded, as for example by the application of some straight solvent to the surface or surfaces to which our adhesive is to adhere. On the other hand, highly dilute solutions may be employed but it will be obvious, from a practical point of view, that there is no need to employ amounts of solvents beyond the amount that is useful because the solvent simply evaporates when the adhesive dries. Usually the solids content of compositions such as shown in Examples I, IV, and V, intended for use primarily in providing adhesive bonds, will be within the range of about 20% to 55 or 60% of the total composition, although this is not critical.

In the above examples the solvent has been illustrated specifically by ethylene dichloride. While most ordinary solvents cannot be used in adhesive compositions as herein defined (comprising olefine polysulfide types of compounds), nevertheless there are a number of other solvents which can be used, of which propylene dichloride, trichlorethane, trichlorbutane, orthodichlorbenzene, etc., are examples. The best solvents are found in the group comprising halogen containing benzene compounds and halogenated aliphatic hydrocarbon compounds, especially the latter.

In connection with the solids content of our adhesive compositions it will be noted that a primary ingredient of all of them is a polyalkylene polysulfide type polymer or equivalent, of which the commercial material "Thiokol F A" is one illustration. Other "Thiokol" resins or compounds may also be used.

Other important ingredients include a halogenated rubber or equivalent and a maleic anhydride-rosin addition product or equivalent. Also, as illustrated in Examples III and IV, a chloroprene polymer such as neoprene, is an important blending agent for the olefine polysulfide type resin or compound. In place of some or all of the chloroprene polymer, such as neoprene, various other hydrocarbon solvent-resistant rubberlike materials which are compatible with the organic polysulfide composition, and especially those capable of lending flexibility to the film or bond, may be used, examples being such materials as various butadiene polymers or copolymers.

In each of the five examples hereinabove given, the organic polysulfide type resin is present to a greater extent by weight than any other specific ingredient employed therein; that is, it is present to a greater extent by weight than the chlorinated rubber; it is also present to a greater extent by weight than the maleic anhydride-rosin addition product. It is quite common for the olefine polysulfide type resin or equivalent to be present to an extent by weight approximately as great, and sometimes greater than the combined weight of the halogenated rubber and the maleic anhydride-rosin addition product, or equivalents. However, although this illustrates an ordinary useful range of organic polysulfide type resins in our composition, this ingredient may be present in either lesser or greater proportions, depending upon other ingredients and other factors, as will be evident from the specification as a whole. For example, when, as in Example IV, a part of the olefine polysulfide type resin is in a sense replaced by a chloroprene polymer (e. g. neoprene), or other compatible synthetic materials, the polyalkylene polysulfide type polymer may be present in a correspondingly lower proportion in relation to the halogenated rubber, in relation to the maleic anhydride-rosin addition product, and/or in relation to the combined weight of both.

While chlorinated rubber or equivalent and maleic anhydride-rosin addition product or equivalent may be used in quite widely varying proportions, as illustrated in the examples given hereinabove, both of such ingredients, and/or their respective equivalents, seem highly desirable, if not imperative, in producing compositions of the present invention. If the quantity of chlorinated rubber or equivalent is decreased too far or eliminated entirely the composition may still have satisfactory adhesion to metal surfaces, cloth surfaces and other surfaces, but will probably lack sufficient cohesive strength to make the same useful as a bonding adhesive; or, if loaded sufficiently with fillers to provide cohesive strength, then will lack sufficient adhesive bonding characteristics. On the other hand, while chlorinated rubber or equivalent appears to contribute substantially to the adhesive or bonding characteristics of the composition when used in combination with maleic anhydride-rosin addition products or equivalents, yet if the latter type of resinous material is reduced too far in quantity, or is eliminated entirely, the chlorinated rubber, regardless of what proportion it is used in, is unable to develop the characteristics provided by the combination of the two modifying agents for the organic polysulfide type resins, as illustrated by the compositions of the examples given hereinabove. In particular, in the absence of maleic anhydride-rosin addition products or equivalent, chlorinated rubber blended with organic polysulfide type compounds tends to yield too brittle a film or coating for the same to have really useful properties as a bonding agent or adhesive film.

From the specific examples shown hereinabove, it will be noted that the chlorinated rubber or equivalent is commonly present to a greater extent by weight than the maleic anhydride-rosin addition product or equivalent, the ratio of such ingredients being commonly within the range of from 1 to 1 to 10 to 1, a common weight ratio being of the order of 2 to 1, more or less.

Of the other solid ingredients mentioned in the above formula the benzothiazyl disulfide serves as a softener for the organic polysulfide type resin during the processing or milling, and helps to avoid shredding or breaking up of the polysulfide composition, and the diphenylguanidine (D. P. G.) serves to accentuate the action of the benzothiazyl disulfide in this respect. (This shows an interesting contrast between the chemical nature of olefine polysulfide type compounds, or the like, on the one hand and rubber on the other, because, in the case of rubber, both D. P. G. and benzothiazyl disulfide serve as accelerators of vulcanization). These ingredients may be varied in amount or replaced by substitute ingredients, in whole or in part, within substantial limits, so long as the desired softening action is secured and the workability of the organic polysulfide type composition is rendered satisfactory.

The carbon black primarily serves as a reinforcing pigment, to enhance the physical characteristics, strength and abrasion resistance of the finished composition. It may obviously be varied widely in amount or replaced by substitute materials. Other pigment or filler type materials may be used for the same or other purposes, and other particulate materials may also be employed where desired. For example, finely-divided cork particles have been added to the liquid adhesive compositions of our invention, together with additional solvent where required, to provide a spreadable composition which when coated on metal or other walkways provided a well-bonded non-skid long-wearing surface having desirable resistance to gasoline, oils, and water.

The zinc oxide serves as a polymerization agent, or perhaps as a catalytic agent, for the organic polysulfide compound, to yield added strength to the resulting adhesive bond and to improve the ageing qualities of the same. Though zinc oxide is illustrated hereinabove as being employed to the extent of about 10% by weight of that of the organic polysulfide type resin, there is nothing critical about these proportions and they can be varied within wide limits, particularly if heat treatments of the compositions are employed. For example, after application of compositions such as illustrated in Examples II and III hereof as a coating or impregnation to cloth, we may and commonly do submit the cloth to heat treatment, for example for about an hour, more or less, at temperatures substantially above room temperatures, e. g. 250° to 280° F. However, the top temperature employed is commonly encountered only for a minor proportion of the whole heating time.

The sulfur serves the function of accelerating the action of the zinc oxide and, while desirable, is in no sense essential.

In respect to the nature of the main ingredients hereinabove discussed, while we employed a chlorinated rubber having a chlorine content of about 66 to 68%, which corresponds approximately to $(C_{10}H_{13}Cl_7)_x$, yet we may employ other equivalent materials, for example other halogenated rubbers of various halogen or chlorine content. Still other resinous and/or gelatinous materials may be employed in place of some or all of the halogenated rubber, within the scope of our invention, to contribute comparable characteristics to the adhesive composition.

The maleic anhydride-rosin addition product employed in the examples indicated hereinabove was made by combining rosin (a conjugated diene compound) and maleic anhydride (an alpha, beta-unsaturated carbonyl compound) according to the Diels-Alder synthesis well known to chemists. (Approximately equal mol proportions of abietic acid and maleic anhydride are heated gradually to a temperature of about 200° C., held as such temperature for about 15 minutes, and then allowed to cool, with occasional stirring). While the maleic anhydride-rosin addition products, employed in the above examples, appear to represent the most practical product for use in our organic polysulfide type adhesives, yet in place of maleic anhydride certain other reactants may be used along with rosin, and/or with rosin derivatives or equivalents, in producing a suitable resinous product, examples of other alpha, beta-unsaturated carbonyl compounds or their equivalents which may be used as substitutes for maleic anhydride being itaconic anhydride, citraconic anhydride, fumaric acid and malic acid. Other possible substitutes for maleic anhydride, where the reaction is suitably controlled, include acetylene dicarboxylic acid and acrolein. As examples of substitutes for some or all of the rosin itself (which is largely abietic acid), by satisfactory control of the process, such other conjugated diene materials may be used as ester gum, penta-erythritol avietate, sorbitol abietate and various rosin esters.

In general various diene resins, i. e. resinous addition products of alpha-beta unsaturated carbonyl compounds and conjugated dienes, preferably those of the non-oily type, may be employed in lieu of the particular maleic anhydride-rosin addition products as herein above described. Another example of diene type resins is "Petrex," which is a terpene-maleic anhydride condensation product (see "Synthetic Resins and Allied Plastics" by R. S. Morrell, 1937, page 256); although this material has not been found by us to be nearly as satisfactory as maleic anhydride-rosin addition products for our polysulfide adhesives.

Polyalkylene polysulfide type polymers have been employed in the above examples and various materials of this class are well known in the arts and readily available in commerce. The term "polythio polymercaptan" may also be employed in characterizing many of these polymeric or resinous materilas. Included in this class of polymers are the polymeric reaction products of such reactants as alkylene polychlorides and alkali polysulfides, alkylene ether polychlorides and alkali polysulfides, etc. These and other illustrative polyalkylene polysulfide polymers are described in various issued patents: see for example various United States Patents of Joseph C. Patrick, such as Nos. 1,890,191, 2,142,144, 2,195,380, 2,206,641, 2,206,642, 2,206,643, 2,216,044, 2,235,621, 2,278,127, 2,363,614, 2,392,402, and other patents, which are included herein by reference. Also see the "Chemistry of Synthetic Resins" by Carleton Ellis, 1935 edition, pages 1169 to 1182, which description is also incorporated herein by reference in connection with olefine and other organic polysulfide type resins, and equivalents, herein contemplated.

The organic polysulfide resin and the maleic anhydride-rosin addition product seem to form some sort of a solution, as contrasted with mere compatible blends of rubber with resins, and, within quite wide variations in ratios of the two materials, the resulting product is softer than either of its constituents.

The above description illustrates in sufficient detail various embodiments and variations of our invention hereby contemplated. As will be seen from the above, we have succeeded in producing an organic polysulfide type composition suitable as an adhesive and, moreover, having good adhesive properties, which is one of the important features of novelty of this invention.

All embodiments within the scope of this disclosure and of the appended claims are comprehended.

What we claim is:

1. As an adhesive, a composition of matter comprising intermixed quantities of a polyalkylene polysulfide resin, chlorinated rubber and a maleic anhydride-rosin addition product, dissolved in a solvent, said polysulfide resin being present in excess of each of said chlorinated rubber and said maleic anhydride-rosin addition product, and said maleic anhydride-rosin addition product being present in substantial proportion but not to a greater extent than the said chlorinated rubber.

2. As an adhesive bonding material, a composition of matter comprising intermixed quantities of a polyalkylene polysulfide plastic, chlorinated rubber and a Diels-Alder type of maleic anhydride-rosin addition product, said ingredients being present in approximately the proportion by weight of 3:2:1, respectively, and being dissolved in a halogenated organic solvent.

3. An adhesive composition comprising a blend of a polyalkylene polysulfide plastic, chlorinated rubber and a maleic anhydride-rosin condensate, in proportions approximating 3:2:1, respectively, said blend being dissolved in a solvent.

4. In the adhesive art a composition comprising intermixed quantities of (1) a polyalkylene polysulfide resin as the base of said composition, (2) chlorinated rubber, and (3) as a tackifier, a maleic anhydride-rosin addition product in an amount of at least about one part by weight to three parts of said polysulfide resin, said chlorinated rubber being present to an extent at least about as large as said tackifier.

5. An adhesive composition capable of producing an adhesive bond between canvas and smooth steel surfaces having a stripback value of at least about 8 lbs. per inch of width, said composition comprising intermixed quantities of (1) a polyalkylene polysulfide resin as the base of said composition, (2) chlorinated rubber, and (3) as a tackifier, a maleic anhydride-rosin addition product in an amount of at least about one part by weight to three parts of said polysulfide resin, said chlorinated rubber being present to an extent at least about as large as said tackifier.

FREDERICK J. WEHMER.
JAMES M. McCLELLAN, Jr.

REFERENCES CITED

The following references are of record in the file of this patent:

UNITED STATES PATENTS

| Number | Name | Date |
| --- | --- | --- |
| Re. 19,487 | Patrick | Mar. 5, 1935 |
| 1,963,856 | Lewis | June 19, 1934 |
| 2,026,875 | Ellis | Jan. 7, 1936 |
| 2,039,243 | Krzikalla | Apr. 28, 1936 |
| 2,046,277 | Ott | June 30, 1936 |
| 2,206,643 | Patrick | July 2, 1940 |
| 2,299,509 | Snyder | Oct. 20, 1942 |
| 2,311,284 | Snyder | Feb. 16, 1943 |
| 2,328,567 | Matthews | Sept. 7, 1943 |

OTHER REFERENCES

Petrex, page 3, received in Patent Office, December 15, 1943.